April 25, 1950        C. HOLLERITH        2,505,245
BREAKAWAY COUPLING
Filed July 30, 1947                          2 Sheets—Sheet 1
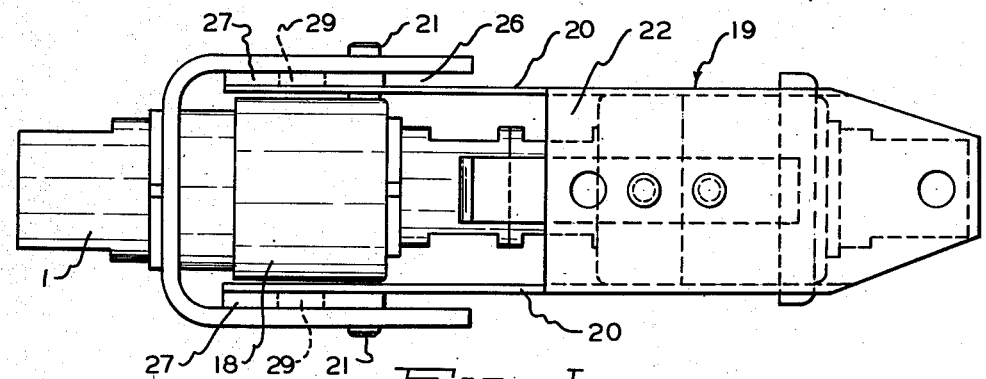
FIG. I.
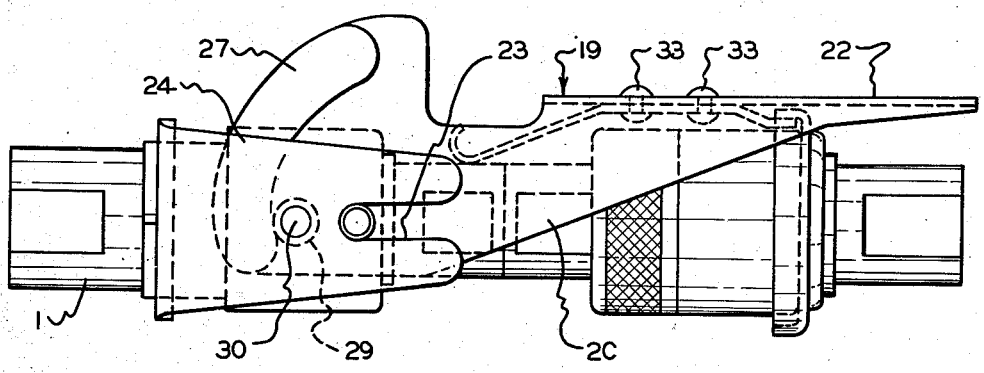
FIG. II.
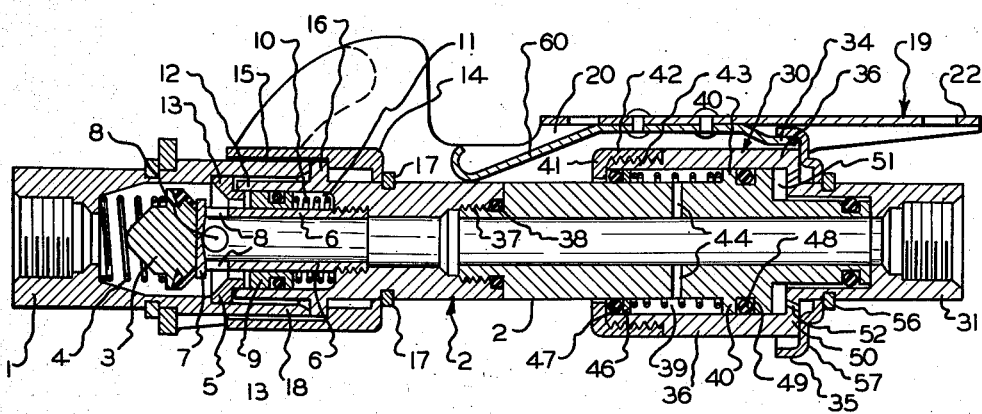
FIG. III.
Inventor
CHARLES HOLLERITH
By Beaman & Patch
Attorneys April 25, 1950 C. HOLLERITH 2,505,245
BREAKAWAY COUPLING
Filed July 30, 1947 2 Sheets-Sheet 2
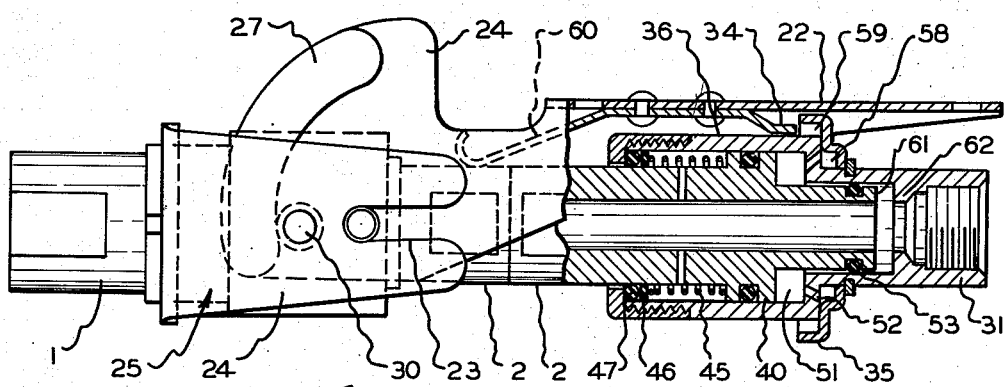
FIG. IV
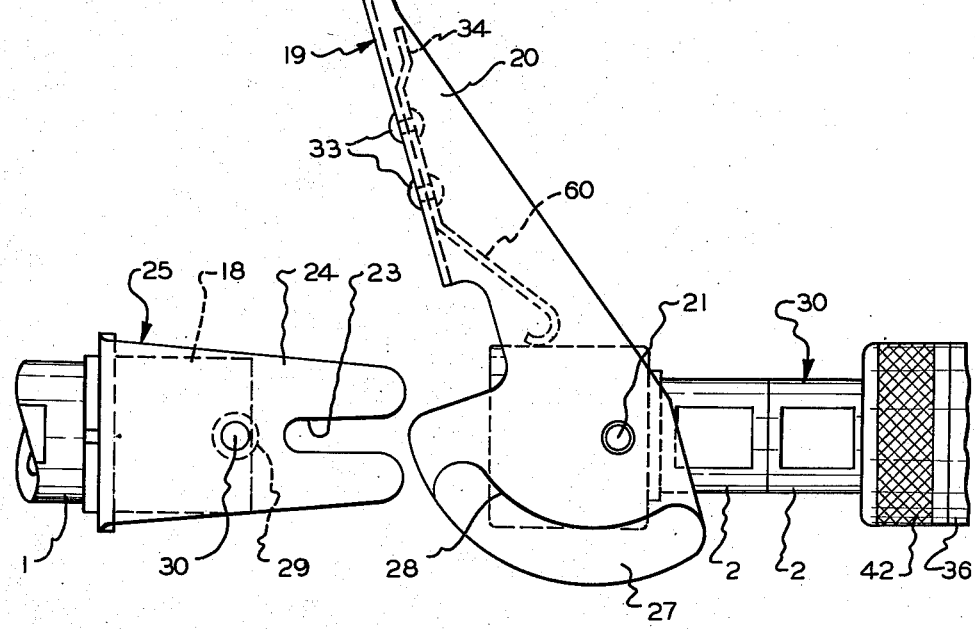
FIG. V
Inventor
CHARLES HOLLERITH
By Beaman & Patch
Attorneys Patented Apr. 25, 1950

2,505,245

UNITED STATES PATENT OFFICE 2,505,245

BREAKAWAY COUPLING

Charles Hollerith, Jackson, Mich., assignor to Aeroquip Corporation, Jackson, Mich., a corporation of Michigan Application July 30, 1947, Serial No. 764,851

4 Claims. (Cl. 284—19)

This invention relates to break-away couplings of the kind employed to couple together the separable ends of a pressure fluid pipe or hose line under conditions where the pipe or hose sections involved are liable to be subjected to an external force which is exerted in the direction of the longitudinal axis of the line, and tends to pull the sections thereof apart, the coupling ends of the latter being fitted with self-sealing valves for automatically sealing the ends of their respective sections when the latter are separated, so as to prevent loss of the pressure fluid, and the coupling means functioning automatically to free the said sections for separation upon the external force attaining a predetermined value.

Such an operating condition obtains where a pressure fluid line is required to be made between a tractor or prime mover and a trailer or farm implement. In such connection provision must be made to protect the coupled parts of the fluid pressure line from being broken or damaged upon an excessive strain being set up between the tractor and trailer, as for example when the trailer (which may be a farm implement as indicated) encounters an unsurmountable obstruction.

As to the mechanical connection of the tractor and trailer, it is customary to make provision for an automatic separation thereof when an excessive strain condition occurs.

The present invention, however, is concerned with the provision of a coupling construction of the kind referred to which will serve to couple together the separable ends of a pressure fluid pipe or hose line under conditions which will also provide for an automatic separation thereof upon an excessive external straining force being encountered as above stated. In other words, the presently described coupling construction provides for the fluid pressure line sections the same releasable securing facilities as the conventional coupling means employed between a tractor and trailer.

It is the object of the present invention to provide an improved construction and form of break-away coupling of the above kind, which is efficient in operation and possesses certain manufacturing and mechanical advantages.

These and other objects of the invention will appear clear from a consideration of the following description and claims with reference to the drawings, in which Fig. 1 is a plan view of one form of break-away coupling in accordance with the invention, showing the coupling in the operative position in which it serves to couple together the opposed sockets of a self-sealing coupling, incorporated in the break-away coupling, each of said sockets housing a self-sealing valve which is automatically opened when the break-away coupling is brought into operative use, as illustrated in this figure, and said sockets being adapted for connection with the ends of their respective pipe or hose sections (not shown) so as to be capable of forming a continuous line for the conveyance of a desired pressure fluid, such as a hydraulic medium, Fig. 2 is a side elevational view of Fig. 1, Fig. 3 is a longitudinal sectional view of Fig. 1, Fig. 4 is a part side elevational and part longitudinal sectional view of Fig. 1, but showing the position of the parts just prior to disrupture of the break-away coupling from its said operative position, and Fig. 5 is a side elevational view showing the break-away coupling in the disconnected condition, with complete separation of the one socket from the other.

In carrying the invention into effect in one convenient manner, and as shown in the drawings, a break-away coupling is provided consisting of a socket part 1 and another socket part 2 constructed and operating to form a self-sealing coupling substantially as disclosed in United States Patent No. 2,208,286, granted to J. Berger, July 16, 1940.

Thus the socket part 1 houses an interior valve plug 3 supported upon a coil spring 4 for automatic closing movement upon an annular seat 5 within the socket part when the latter is separated from the other socket part 2, while the latter houses a fixed interior tube 6 closed at one end, as indicated at 7, and having holes 8 adjacent its closed end which are closed by a valve sleeve 9 when the sockets are separated to prevent escape of fluid from this socket part 2.

The valve sleeve 9 is spring biased by the coil spring 10 and is slidable upon the outside of the tube 6 in the annular space 11 formed between the latter and the end portion 12 of the socket 2, which socket portion is located within the diameter limits of the annular valve seat 5, and which latter has an inner ring portion located within the diameter limits of the valve sleeve 9.

Also, the socket part 2 is fitted at its coupling end with an external ring part 14 forming an annular space 15 between itself and the said end socket portion 12 and axially, but rotatably, fixed in position upon its socket part 2 by being retained between a radial shoulder 16 on the latter and a spring ring clip 17.

Upon the two socket parts being coupled together, the end portion 18 of the socket part 1 enters into the annular space 15 while at the same time the flat disc shape end surface of the closed end 7 of the interior fixed valve tube 6 of the other socket part 2 bears against the corresponding end surface of the valve plug 3. Also the socket part 12 engages the corresponding portion of the annular valve seat 5 and the inner ring portion 13 of this seat engages the corresponding portion of the slidable valve sleeve 9. The resulting relative telescoping movement of the thus related parts causes the valve plug 3 to be pushed back off its annular seat 5 at the same time as the valve sleeve 9 is pushed back against the action of its spring 10, to open the holes 8, with the result that communication is established for a free flow of fluid through the connected socket parts.

This coupling together of the socket parts and the relative movement necessary to accomplish the same is effective with the employment of a mechanical advantage produced by a forked lever 19 having opposite side flanges 20, pivotally mounted, near one end of the lever, upon diametrically opposite fixed pins 21 projecting from the ring part 14 of the socket part 2, and united by a transverse web part 22. These pins 21 are adapted to engage in the open ended fork slots 23 of their corresponding limbs 24 of a U-plate 25 fixedly secured upon the outside of the socket part 1 so that the limbs 24 are transversely spaced on opposite sides of the end portion 18 of this socket part and extend in the direction of the longitudinal axis of the latter and towards the other socket part 2, whereby the open ends of the fork slots 23 are positioned to receive their respective pins 21 when the two socket parts are brought together in the coupling operation and the arcuate shape end portions 20a of the lever flanges 20 are capable of entering the spaces 26 between their corresponding limbs 24 of the U-plate 25 and the said end portion 18 of the socket part 1. The said arcuate lever end portions carry corresponding arcuate strips 27 on the outside thereof, the inner edges 28 of which arcuate strips are eccentric to the pivot pins 21 and give rise to a cam action when the lever is swung towards the socket part 2 into the position shown in Figs. I to IV, and whereby the aforesaid mechanical advantage obtains. These cam strips 27 are located in the said spaces 26 to lie behind antifriction rollers 29 mounted upon pins 30 on the inside surfaces of side limbs of the U-plate 25, so that the required cam action results from the rolling of the cam edges 28 over their respective antifriction rollers 29.

Referring now to the automatic break-away action of this coupling construction, and which forms an essential feature thereof, it will be seen from the drawings that the socket part 2 carries a separate ring part 30, which is mounted for limited relative sliding movement upon the outside of the socket part 2 and incorporates the end portion 31 of this socket part remote from the valve closed end thereof, and that the lever 19 carries a stout spring blade 32 centrally secured in its central portion (as by rivets 33) to the inside surface of the transverse web portion 22 of the lever, and having one sprung free end portion 34 thereof engageable with the interior surface of an annular collar 35 secured fast upon the end of the ring part 30. The said ring part 30 is of composite construction and comprises a main ring part 36 mounted about the exterior of the socket part 2 (which is itself conveniently formed in two sections, screw united as indicated at 37 in Fig. III, and sealed at the resulting joint by a sealing ring 38) so as to be coaxial therewith, and forming with the exterior surface of the socket part 2 an annular chamber 39 closed at one end by an outwardly directed radial shoulder 40 on the socket part, and at the other end by an inwardly directed radial flange 41 on a cap part 42 screwed upon the corresponding end of the ring part 36, as indicated at 43. This annular chamber 39 is in permanent communication with the interior of the socket part 2 via holes 44 in the latter (see Figs. III and IV), and houses a coil spring 45 bearing at one end against the shoulder 40 and at the opposite end against a pressure ring 46, itself pressing against a sealing ring 47 which serves to seal this end of the annular chamber 39, the opposite end of the latter being sealed by an external sealing ring 48 accommodated in an annular groove 49 on the exterior of the shoulder 40.

The main ring part 36, at the end thereof adjacent the one socket extremity 31, is formed with a radial web 50 by which the larger diameter ring part 36 and the smaller diameter socket extremity 31 are joined together, and this radial web 50 defines, with the side of the shoulder 40 remote from the annular chamber 39, another annular chamber 51, which is open to the atmosphere via holes 52 in the web 50, this chamber 51 being sealed with respect to the interior of the socket part 2 by the sealing ring 48 on the one hand, and by a sealing ring 53 on the other, the sealing ring 53 being accommodated in an external groove 54 on the reduced extremity portion 2a of the socket part 2.

The collar 35 is retained upon the axially slidable socket portion 31 by a spring ring clip 56 and by the engagement of the web 57 of the collar with the web 50 of the main ring part 36, and the construction is such as forms an external annular air ring 58 with which the holes 52 communicate, and which air ring has "bleed" access to the atmosphere. Also, the collar 35 forms an internal annular gap 59 into which the free sprung blade portion 34 can enter when the coupling lever 19 is swung inward in order to couple the sockets together, as shown in Figs. II and III. In this condition the opposite sprung free end blade portion 60 is stressed into engagement with the exterior of the socket part 2.

The construction and operation is such that in the coupled condition, as shown particularly in Fig. III, the hand lever 19 is held depressed by the engagement of the sprung blade end 34 within the gap 59, and with the interior surface of the collar 35.

If, however, the thus coupled parts are subjected to an external force applied in the direction of the longitudinal axis of the coupling, and which tends to pull the sockets apart, this will produce a limited relative sliding movement between the socket part 2 and the ring 30, which will cause the blade end 34 to leave the gap 59, as shown in Fig. IV, whereupon the stressed blade end 60 immediately acts to swing the lever 19 outwards with the result that the socket parts are freed for separation and the valves therein are closed.

It will be appreciated, therefore, that this break-away action relies upon some relative axial movement taking place in the actual fluid line, such as either elongates, as shown in Fig. IV, or contracts, (Fig. III), the effective length of the socket part 2. It is accordingly necessary either to make up or to remove a corresponding amount of the pressure fluid within the line, and this compensation is afforded by the annular fluid chamber 39, from which the fluid can flow into the socket part 2, on elongation thereof, or into which chamber fluid from the socket part 2 can be displaced upon contraction of the effective length thereof.

The air spaces 51 and 58 provide the necessary balance compensation to permit this fluid transfer to take place.

When elongated, the end 61 (Fig. IV) of the socket part 2 adjacent the axially slidable socket extremity 31 will be axially separated from an inwardly directed radial flange 62 on the latter, which flange forms a seat for said end 61, in the contracted and coupled condition of the parts as seen in Fig. IV. The extent of this axial movement corresponds approximately to the extent of the relative axial movement of the blade end 34 with respect to the collar 35.

While the invention has been described with reference to one particular embodiment of the invention, it is to be understood that the invention may take other forms and that constructional changes may be made to suit particular requirements or practical considerations without departing from the scope of the appended claims.

Having thus described my invention, what I desire to secure by Letters Patent and claim is:

1. In a fluid pressure coupling assembly comprising a hollow body part forming a fluid conductor, valve means in said conductor, means normally biasing said valve means into a closed position with respect to its body part, a second hollow body part forming also a fluid conductor and separable from said first body part, valve means in said second conductor, and means normally biasing said last-mentioned valve means also into a closed position with respect to its associated body part, a lever member on one of said body parts, a separate part on the latter axially slidable thereon to engage or disengage said lever means adapted to bias said axial slidable part into lever engaging relation, and means on the other hollow body part releasably connectable with said lever and coactive therewith to couple the body parts together with a mechanical advantage which overcomes the combined internal fluid pressure within the coupling body parts and said valve biassing means and automatically produces an opening movement of said valves to establish a straight-through fluid passage through the two body parts, said axially slidable part on the one body part being adapted to release the lever under the influence of a force, exerted in the direction of the longitudinal axis of the coupled body parts, and which tends to break the latter apart, whereby to permit the internal pressure within the coupled parts to separate the latter.

2. In a fluid pressure coupling assembly as claimed in claim 1, cam means on said lever, said cam means being engageable with said connecting means on the other body part, in a closing movement of the lever onto its body part, to constrain the said valves to open against the internal pressures at the same time as the two body parts are being coupled together by the movement of said lever into engaging position with said slidable part.

3. A fluid pressure coupling as claimed in claim 1, said axially slidable part being constituted by a sleeve reciprocable upon its said body part, a co-axial end extension of the latter carried by said sleeve, the latter forming an interior annular chamber surrounding said body part, a piston part on the latter reciprocable within said annular chamber, said body part having port means providing for a flow of the pressure fluid between the interior of the body part and the annular chamber, and spring means operatively connected with said sleeve and adapted to urge the latter normally into the lever engaging position while permitting relative movement to take place between the sleeve and its body part to position the sleeve for disengagement from the lever.

4. A fluid pressure coupling as claimed in claim 1, a collar on said sleeve providing a retaining surface for the free end of the lever when the latter is in the closed position, spring means operatively connected with said sleeve and adapted normally to position and hold said collar in its lever engaging position, and spring catch means on said lever adapted to be tensioned into engagement with said collar surface, to hold the lever closed, when the lever is closed upon its body part in the operation of coupling the two body parts together.

CHARLES HOLLERITH.

REFERENCES CITED

The following references are of record in the file of this patent:

UNITED STATES PATENTS

| Number | Name | Date |
|---|---|---|
| 378,284 | Briscoe | Feb. 21, 1888 |
| 406,964 | Stedman | July 16, 1889 |
| 1,966,679 | Paul | July 17, 1934 |
| 2,333,423 | Hufferd | Nov. 2, 1943 |